United States Patent [19]

Hamada et al.

[11] 4,217,579
[45] Aug. 12, 1980

[54] METHOD OF DRIVING ELECTROCHROMIC DISPLAY MEANS AND ELECTROCHROMIC DISPLAY MEANS THEREFOR

[75] Inventors: Hiroshi Hamada, Tenri; Hiroshi Nakauchi, Nara; Yasuhiko Inami, Tenri; Hisashi Uede, Wakayama, all of Japan

[73] Assignee: Sharp Kabushiki Kaisha, Osaka, Japan

[21] Appl. No.: 830,209

[22] Filed: Sep. 2, 1977

[30] Foreign Application Priority Data

Sep. 3, 1976 [JP] Japan .............................. 51/106520

[51] Int. Cl.² .......................... G06F 3/14; G09F 9/32
[52] U.S. Cl. ................................... 340/763; 340/785; 340/811; 350/357
[58] Field of Search ............. 340/324 R, 324 M, 336, 340/811, 812, 785, 763; 350/357

[56] References Cited

U.S. PATENT DOCUMENTS

| 3,938,131 | 2/1976 | Van Doorn et al. | 340/324 R |
| 4,009,936 | 3/1977 | Kasai | 340/785 |
| 4,057,739 | 11/1977 | Otake | 340/324 R |

*Primary Examiner*—Marshall M. Curtis
*Attorney, Agent, or Firm*—Birch, Stewart, Kolasch & Birch

[57] ABSTRACT

A method of driving an electrochromic display means and the electrochromic display means therefor which includes an electrochromic display cell having a counter electrode and a plurality of display electrodes, and a constant voltage source coupled through switching means to the electrochromic display cell in such a manner that the display electrodes to be colored are maintained at the same potential as that of the counter electrode, while the display electrodes to be erased are impressed with a predetermined positive voltage with respect too the counter electrode.

24 Claims, 13 Drawing Figures

METHOD OF DRIVING ELECTROCHROMIC DISPLAY MEANS AND ELECTROCHROMIC DISPLAY MEANS THEREFOR

The present invention relates to a display means, and more particularly, to a driving method for a display means (so-called electrochromic display and referred to as ECD hereinbelow) and display means therefor including two substrates at least one of which is transparent, corresponding electrodes at least one of which is also transparent and which are respectively provided on the opposed surfaces of said substrates, and a substance (so-called electrochromic substance and referred to as EC substance hereinbelow) whose visible light absorbing characteristics reversibly vary depending on voltage or current applied to said electrodes.

Recently, particular attention and interest have been directed to the application of ECD which can be driven at low voltage to display means especially for battery-driven portable electronic appliances and the like.

In the first place, a general outline of the ECD will be described hereinbelow. There have generally been known two types of ECDs, i.e., one type in which an EC substance of liquid phase is oxidized or reduced electrochemically for deposition of reaction product on the electrode, and the other type in which an EC substance of solid phase provided on the electrode surface is oxidized or reduced to alter its visible light absorbing characteristics for display. The latter type includes, for example, a system employing a film of transition metallic oxide such as $WO_3$ (tungsten oxide) together with electrolyte, and disclosed in RCA review, 36, 177 (1975) by B. W. Faughnan et al.

The present invention relates to a method for driving an ECD employing the system of the above described type. Shown schematically in FIG. 1 is a diagram showing a fundamental construction of such an ECD cell which includes a pair of opposed substrates 1 of insulating material, a display electrode 2 applied onto an inner surface of one of the substrates 1, a counter electrode 3 applied onto an inner surface of the other of the substrates 1 in a position adjacent to a reference electrode 4, spacers 5 disposed between the substrates 1, electrolyte 6 accommodated in a space between the substrates 1, films 7 of EC substance formed on the electrodes 2 and 3 respectively, and insulating films 8 formed on the display electrode 2 to surround the film 7 of EC substance.

In FIG. 1, when current is caused to flow from the counter electrode 3 to the display electrode 2, the ECD is colored corresponding to the amount of electrical charge which has flowed (referred to as writing hereinbelow) and when the same amount of electrical charge is caused to flow in a direction opposite to the above, the ECD is brought back to the original non-colored state (referred to as erasing hereinbelow). If the coloring is not very high in density, the relation between the transmittance $T(\lambda)$ at a given wave length and amount of charge $\sigma$ which has flowed per unit area is represented by the following equation $$-\log T(\lambda) = \epsilon(\lambda) \cdot \sigma$$

wherein the value $\epsilon(\lambda)$ has wavelength dependency inherent in the EC substance, and was found to be in the following range according to the measurement taken by the present inventors when the tungsten oxide $WO_3$ was employed as EC substance.

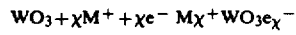

In this case, mechanism of coloring is explained as follows.

$$WO_3 + xM^+ + xe^- \rightarrow M_x^+ WO_3 e_x^-$$

$$M^+: H^+ \cdot Li^+ \cdot Na^+ \cdot K^+ \text{ etc.}$$

Meanwhile, if the ECD once colored is subsequently cut off electrically from the driving circuit, with high impedance maintained between the display electrode 2 and counter electrode 3, the colored state can be maintained from several hours to several days without consumption of energy. The features of the ECD may be summarized as follows.

(i) The ECD has an extremely wide viewing angle.

(ii) The ECD has good contrast not dependent on the viewing angle.

(iii) The ECD can be driven at low voltage (less than several volts).

(iv) The colored state of the ECD is maintained from several hours to several days even after the impressed voltage has been removed (memory effect).

(v) In the ECD, the density of coloring is determined solely by the amount of electrical charge caused to flow.

(vi) In the ECD, energy consumption is proportional to area of display and the number of cycles of coloring and color erasing.

For driving the ECD, the following three methods may be employed.

(1) Constant potential driving method

In FIG. 2, the plus input of an amplifier 11 is connected to ground through terminals U to which a voltage of set value is to be applied, while the minus input of the amplifier 11 is coupled to the reference electrode 4 of the ECD, with the output of the same amplifier being connected to the counter electrode 3. The display electrode 2 is formed into a plurality of segments each connected to ground through a segment selection switch 12. It is to be noted here that when a plurality of display electrodes 2 are formed so as to be properly selected for being colored for indications of numerals, symbols, letters, etc., each of such display electrodes 2 is referred to as a segment. In FIG. 3, there is shown one example of pattern employing seven segments a, b, c, d, e, f and g for displaying numerals from zero to nine.

By this arrangement, the voltage to be impressed on the counter electrode 3 is controlled so that the potential difference between the display electrode 2 and reference electrode 4 becomes equal to the set voltage at the terminals U. In the above case, if the potential of the display electrode 2 with respect to the reference electrode 4 is maintained at the predetermined value $E_w$ (lower than the threshold value represented by $E_{th}$), the coloring of the ECD is started, while the color of the ECD is bleached when the potential of the display electrode 2 with respect to the reference electrode 4 is maintained at the predetermined value $E_e$ higher than said $E_{th}$. In FIG. 2, since the display electrode 2 is grounded, the potential of the display electrode 2 is made low with respect to the reference electrode 4 when the voltage at the terminals U is positive.

In FIG. 4, the relation between the equilibrium potential E of the display electrode 2 and absorbance A (which equals −log (light transmittance)) is shown.

For actually driving the ECD, setting the writing potential $E_w$ to the equilibrium potential $E_c$ corresponding to the coloring density desired is not practical, since an excessively long period of time is required before reaching the state of equilibrium. Accordingly, at the time of writing, the potential is maintained at a potential $E_w$ (more positive in the value at the terminals U) lower than the equilibrium potential $E_c$ corresponding to the desired coloring density, while at the time of erasing, it is maintained at a potential $E_e$ (more negative in the value at the terminals U) higher than the threshold potential $E_{th}$, and when the coloring density has reached the predetermined density as the current flows, the current is interrupted, with the segment selection switch 12 opened for maintaining the memory state. It is to be noted that if the segment selection switch 12 is kept open during driving the colored state or the bleached state is maintained as it is, even if other segments are driven. It should also be noted, however, that in this type of display, it is impossible to erase other segments during coloring of any one segment, so writing and erasing should be done at different time phases.

The method as described above has an advantage in that decomposition of the electrolyte and deterioration of the EC substance or electrodes can be prevented by selecting the writing potential $E_w$ and erasing potential $E_e$ to be in a potential range in which undesirable side reactions will not be brought about. More specifically, in the above selection, the writing potential $E_w$ and the erasing potential $E_e$ are chosen in such relations as $E_{s1} < E_w$ and $E_e < E_{s2}$, where $E_{s1}$ and $E_{s2}$ are the potentials at which the side reactions are brought about. On the contrary, in the method as described above in which the potential at the counter electrode is not controlled, flaws such as decomposition of the electrolyte, deterioration of the counter electrode 3, etc., may be brought about due to application of excessive voltage unless charging and discharging are smoothly effected through proper selection of reaction system in the counter electrode. The problems as described above, however, may be prevented by limiting the range of voltage to be applied to the counter electrode 3 through lowering the power source voltage at the amplifier 11, etc. Additionally, from the viewpoint of circuit construction, it is necessary to provide an analog circuit capable of dealing with a large electric current to a certain extent (several tens of mA per cm² of display area). It is to be noted that the segment selection switches 12 may be replaced by equivalent semi-conductor switches for electronic switching over in the constant potential driving method of FIG. 2 or in the constant current driving method of FIGS. 5, 6 and 7 and constant voltage driving method of FIGS. 8 and 9 described hereinbelow.

(2) Constant current driving method

In the constant current driving method in FIG. 5, the ECD is coupled to a constant current source 21 through contacts for writing W, memory M and erasing E, and contactors of a change-over switch 22 which are selectively connected to corresponding writing and erasing contacts W and E only during writing and erasing, and which are cut off during memory. The above driving method in which the amount of the charge to flow is set to the desired amount has an advantage in that the coloring density can be set to a predetermined value, even when voltage drop due to resistance of the electrode lead-out portions or deviation in the characteristics of the EC substance is present. In addition, if the counter electrode 3 is grounded with a constant current source being provided for each of the segments 2, it is possible to color some of the segments 2, while other segments are erased simultaneously.

The circuit in FIG. 5 may be modified as shown in FIG. 6 in which a constant current source capable of varying current value depending on the number of segments (display area) to be driven is employed.

In FIG. 5, the ECD is connected to the constant current source 21' whose current value is varied by signals n of the number of driven segments from a counting circuit 23 of the number of driven segments, to which circuit 23, segment signals "Seg" are to be applied, while each of the display electrodes or segments 2 is connected to the ground through the segment selection switch 12' which is coupled to the input side of the counting circuit 23.

In the arrangement as described above, if there is any slight difference in the setting of charge amount for writing and erasing, such an error is accumulated at every repetition of writing and erasing cycle, with the reaction deviating to one direction. In other words, if the amount of charge for writing is larger than that for erasing, coloring is caused to proceed to such an extent that perfect erasing can not be effected. On the contrary, if the amount of charge for erasing is larger than that for writing, the current is caused to flow in even after completion of the erasing, thus inevitably giving rise to undesirable side reactions such as decomposition of electrolyte, deterioration of electrodes, etc. In the above case, when a side reaction starts to take place with the erasing nearly completed, the potential at the display electrode is suddenly raised, which fact may be utilized to limit the range of voltage variation at the constant current source so that the potential of the display electrode does not exceed the potential at which the side reaction starts to occur, with consequent suppression of such side reaction.

In FIGS. 7(a), 7(b) and 7(c), there are shown examples 21A, 21B and 21C, respectively, of circuit construction of the constant current source 21'. In FIG. 7(a), the input terminal S is connected through a resistance R to the bases of transistors Tr1 and Tr2 whose emitters are connected to each other and to the ground, while the collectors of the transistors Tr1 and Tr2 are connected to the bases of transistors Tr3 and Tr4 respectively. The collectors of the transistors Tr3 and Tr4, connected to each other, are further connected to the output terminal $I_{out}$, with $+V_{CC}$ being connected to a junction between the collector of the transistor Tr1 and the base of the transistor Tr3 through a diode D1 and also to the emitter of the transistor Tr3, while $-V_{EE}$ is connected to a junction between the collector of the transistor Tr2 and the base of the transistor Tr4 through a diode D2 and also to the emitter of the transistor Tr4. In the modified circuit 21B of FIG. 7(b), the grounding at the emitters of the transistors Tr1 and Tr2 is dispensed with, while the input terminal S described as connected to the bases of the transistors Tr1 and Tr2 in FIG. 7(a) is modified to be connected through the resistor R to the junction between the emitters of the transistors Tr1 and Tr2, and the bases of the same transistors Tr1 and Tr2 are grounded, with a resistor Re being further inserted between $-V_{EE}$ and the emitter of the transistor Tr4. Other construction of the circuit 21B of FIG. 7(b) is the same as the circuit 21A in FIG. 7(a). In the further modification 21C in FIG. 7(c), the diodes D1 and D2, and the resistor Re described as employed in the circuit of FIG. 7(b) are dispensed with for simplification. In either of the above circuits in FIGS. 7(a) to 7(c), a current proportional to the current flowing through the terminal S is obtained at the output terminal $I_{out}$.

(3) Constant voltage driving method

In the constant voltage driving method of FIG. 8, the constant current source 21 of FIGS. 5 and 6 is replaced by a writing constant voltage source 31 and an erasing constant voltage source 32 which are connected to the counter electrode 3 and also to the display electrode or segment 2 through a change-over switch 33 for switching over between the writing W, memory M and erasing E. It is to be noted here that the writing voltage Vw of the voltage source 31 needs not necessarily be made equal to the erasing voltage Ve of the voltage source 32. Although the writing voltage source 31 and erasing voltage 32 are separately provided in the arrangement of FIG. 8, the circuit construction may be modified as in FIG. 9 in which lower voltage is obtained from a constant voltage source 34 of higher voltage through proper division by resistance, with the polarity being changed over by the change-over switch 33'.

In the constant voltage driving method as described above also, high voltage must be impressed if charging and discharging at the counter electrode 3 is not smoothly effected, thus presenting the possibility of an undesirable side reaction. Meanwhile, the constant voltage driving method is advantageous when low power consumption is aimed at as in the application of the ECD to electronic appliances to be driven by batteries, since the circuit construction for the constant voltage driving method is simple as compared with those for the constant potential and constant current driving methods mentioned earlier, with the highest rate of utilization of the power source energy.

The constant voltage driving method, however, has such a disadvantage that, when the same material as the EC substance used for the display electrode is employed as reaction substance at the counter electrode, the density of coloring of the display electrode 2 depends on the density of coloring of the EC substance at the counter electrode 3 even if the same driving voltage is applied.

Accordingly, an essential object of the present invention is to provide an improved driving method for electrochromic display means (ECD) and the electrochromic display means therefor through a further improvement of the constant voltage driving method.

Another important object of the present invention is to provide a driving method for electrochromic display means and the electrochromic display means therefor of the above described type which is free from nonuniformity in the density of coloring for display.

A further object of the present invention is to provide a driving method for electrochromic display means and the electrochromic display means therefor of the above described type employing a simple circuit construction with stable functioning.

A still further object of the present invention is to provide a driving method for electrochromic display means and the electrochromic display means therefor of the above described type which is low in driving voltage and power consumption, and particularly suitable as display means for portable electronic appliances and the like driven by batteries.

In accomplishing these and other objects, according to one preferred embodiment of the present invention, the electrochromic display means includes an electrochromic display cell having a counter electrode and a plurality of display electrodes, and a constant voltage source coupled through switching means to the electrochromic display cell in such a manner that the display electrodes to be colored are maintained at the same potential as that of the counter electrode, while the display electrodes to be erased are impressed with a predetermined positive voltage with respect to the counter electrode, by which arrangement, an improved method of driving an electrochromic display means and the electrochromic display means therefor which is uniform in the density of coloring for display are advantageously presented through simple construction.

These and other objects and features of the present invention will become apparent from the following description taken in conjunction with the preferred embodiment thereof with reference to the attached drawings, in which:

FIG. 2 is an electrical circuit diagram showing a circuit construction for a conventional constant potential driving method for an ECD which has already been referred to;

FIG. 5 is a schematic circuit diagram showing a circuit construction for a conventional constant current driving method for ECD which has also been already referred to;

Figure 1:
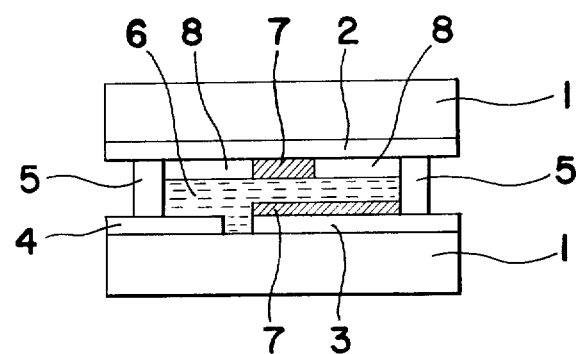
FIG. 1 is a schematic side view, partly in section, showing a fundamental construction of an electrochromic display (ECD) cell already referred to and employed in driving circuitry according to the present invention.
Figure 2:
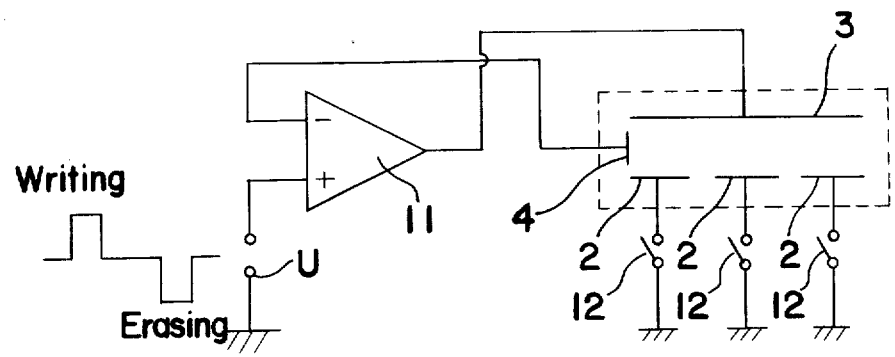
Figure 3:
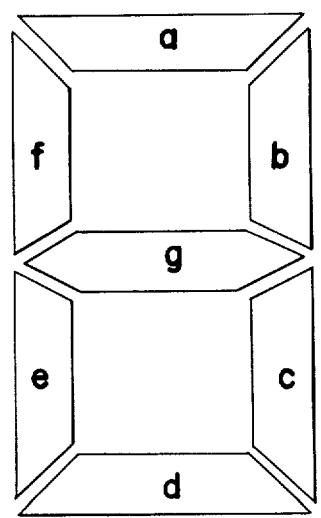
FIG. 3 is a schematic diagram showing, on an enlarged scale, a construction of an ECD segment pattern already mentioned.
Figure 4:
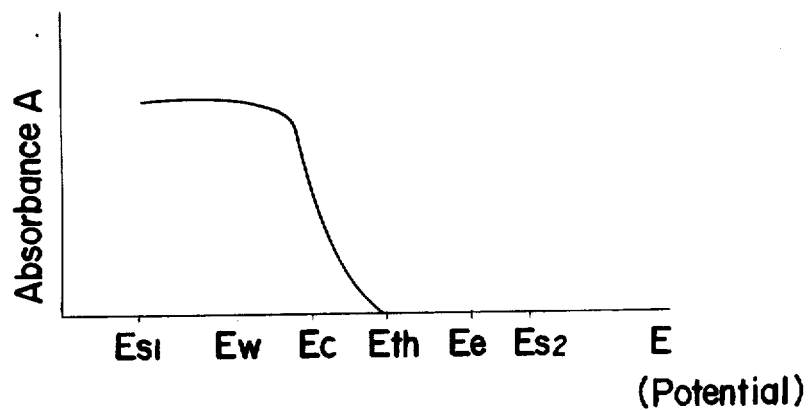
FIG. 4 is a graph showing the relation between the equilibrium potential of display electrodes and absorbance.
Figure 5:
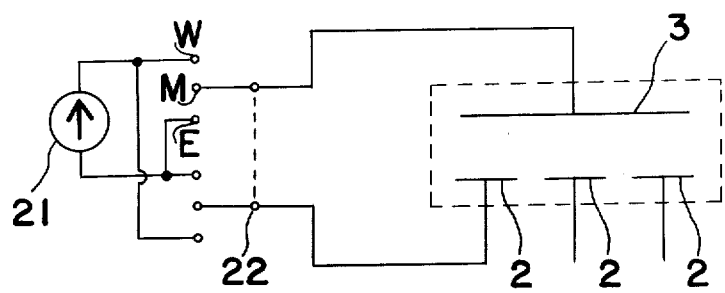
Figure 6:
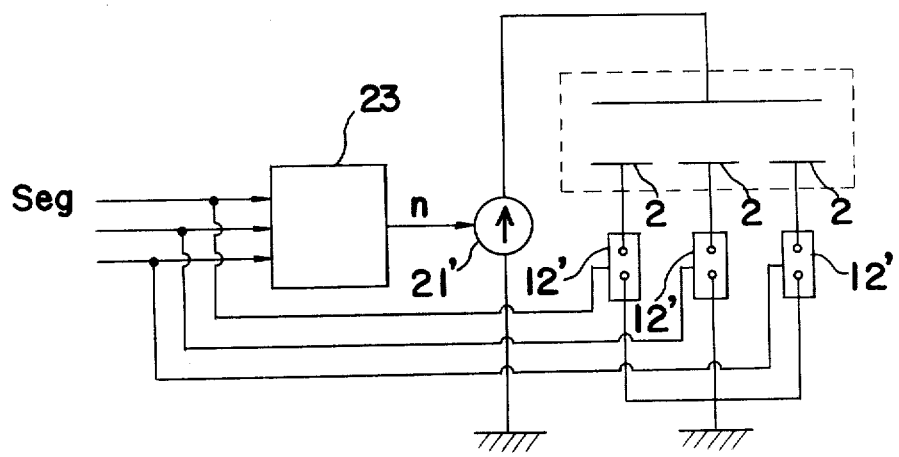
FIG. 6 is a similar diagram to FIG. 5, but particularly shows a modification thereof.
Figure 7A:
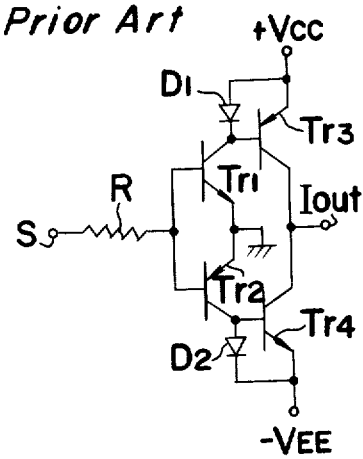
Figure 7C:
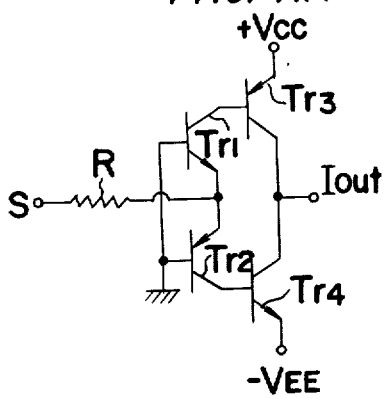
Figure 7B:
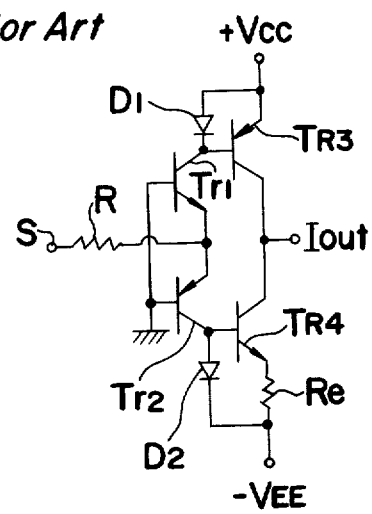
Figure 8:
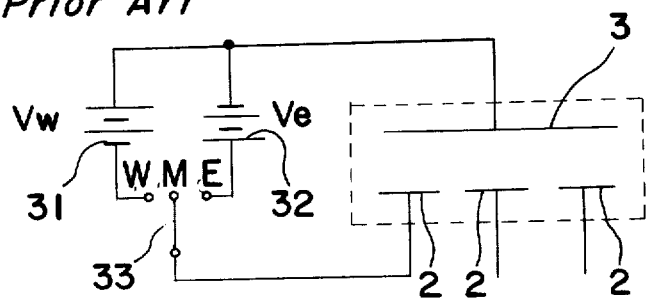
Figure 9:
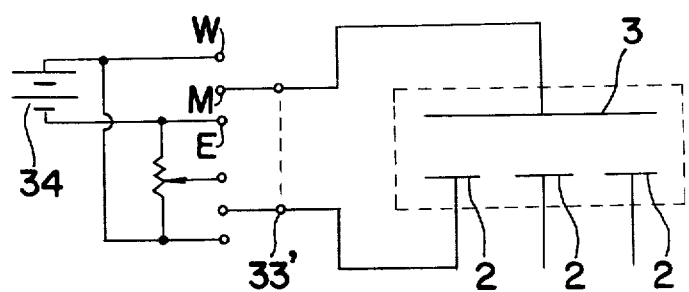
Figure 10:
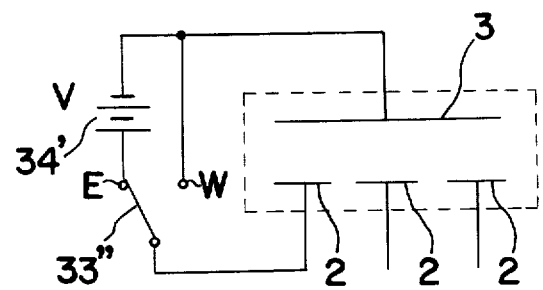
Figure 11:
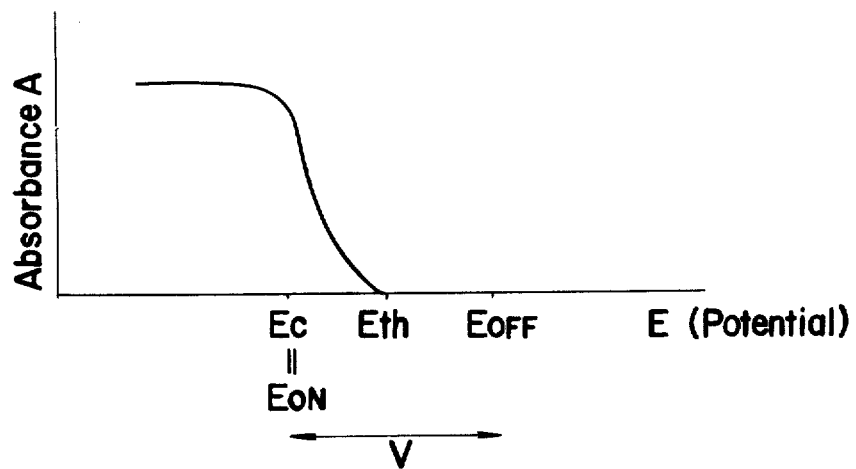

FIGS. 7(a) to 7(c) are electrical circuit diagrams showing examples of conventional constant current sources which may be employed in the circuits of FIGS. 5 and 6;

FIG. 8 is an electrical circuit diagram showing a circuit construction for a conventional constant voltage driving method for an ECD which has been already referred to;

FIG. 9 is a similar diagram to FIG. 8, but particularly shows a modification thereof;

FIG. 10 is an electrical circuit diagram showing a circuit construction for a driving method for an ECD according to one preferred embodiment of the present invention; and FIG. 11 is a graph showing the relation between potentials at respective electrodes and absorbance according to the driving method of the present invention.

Before the description of the present invention proceeds, it is to be noted that like parts are designated by like reference numerals throughout several views of the accompanying drawings.

In the first place, the ECD employed in the driving method of the present invention was prepared as follows.

Onto a substrate made of soda-glass, $In_2O_3$ was deposited through electron beam evaporation to a film thickness of 2,000 Å for the formation of the transparent conductive film thereat, with surface resistance of 20 Ω/sq, and subsequently, $WO_3$ as the EC substance was further deposited by thermal evaporation under the depositing conditions of substrate temperature at 350° C., film thickness of 5,000 Å, deposition rate of 10 Å/sec., and pressure of $5 \times 10^{-4}$ torr ($O_2$ leak). $WO_3$ was deposited over the entire surface of the substrate for the counter electrode 3, while mask deposition was effected only at the segment portion of the substrate for the display electrode 2, in which $In_2O_3$ was further divided into segments by the known photo-etching method, with a solution prepared by dissolving $FeCl_3$ into HCl being employed as the etching solution of $In_2O_3$. Subsequently, epoxy resin was applied to leading-out portions of the segments through screen printing for protection. The substrate for the counter electrode 3 and the substrate for the display electrode 2 prepared in the above described manner are bonded to each other through spacers of glass rod of 1 mm square, with the electrolyte being enclosed in the space between the electrodes 3 and 2. The electrolyte employed was prepared by mixing $BaSO_4$ for white background, at the weight ratio of 1:1, with a solution prepared by dissolving $LiClO_4$ into Cellosolve acetate ($CH_3COOC_2H_4OC_2H_5$) (name used in trade and manufactured by UCC company of U.S.A.) at a concentration of 1.0 mol/l, with subsequent kneading of the resultant mixture into a paste-like form. In the above case, the reason for employing the white background is to make the coloring of the counter electrode 3 invisible from the side of the display electrode 2, and also to improve the contrast ratio when the writing is made at the same amount of charge. Actually to obtain a certain contrast ratio, the ratio of required charge density per unit display area among transmittive type, specular reflection type and diffusive reflection type is 1:0.5:0.3∼0.4 respectively, where contrast ratio is defined as the ratio of light transmission or reflection between in colored state and in color-erased state. From the above, it is noted that the diffusive reflection type is superior to the transmitting type or specular reflection type. It should be noted here that in the case of the diffusive reflection type, the contrast ratio is varied depending on the property of the diffusive reflection surface.

Referring to FIG. 10, there is shown a circuit diagram for effecting the driving method according to the present invention, by which the ECD cell prepared in the above described manner is driven. In FIG. 10, the negative terminal of the constant voltage source 34' is connected to the counter electrode 3 and to the writing contact W, while the positive terminal of the same constant voltage source 34' is coupled to the segments 2 to be selected through the segment selection switches 33" each of which can be switched over between the erasing contact E and writing contact W. The driving method of the invention employing the circuit construction of FIG. 10 is characterized in that a predetermined positive voltage V of the constant voltage source 34' is applied to the non-selected segments for maintaining them in color-erased state, while the counter electrode 3 is maintained in properly colored state. Subsequently, when the change over switch 33" for the segment to which the writing is to be made is changed over to render the particular segment to be of the same potential as the counter electrode 3, the segment is rapidly colored at the same density as that in the counter electrode 3. In this case, if the area of the counter electrode 3 is made several times as large as that of the display area of the segments, the difference of coloring density due to the number of segments selected may be neglected. It should be noted here that even if the erasing voltage V is continuously applied to the non-selected segments, power consumption is trivial, since residual current flowing is very small after erasing is accomplished. Such residual current is considered to be of such an extent as will compensate the discoloration of the counter electrode 3 due to leak current and residual oxygen etc., in the electrolyte.

Referring also to FIG. 11, there is shown the relation between the absorbance and equilibrium potentials at respective electrodes. In FIG. 11, the threshold potential is represented by $E_{th}$, potential of the counter electrode by $E_c$, potentials of the segments at colored and erased states by $E_{on}$ and $E_{off}$, and voltage from the constant voltage source by V respectively. According to the experiments carried out by the present inventors, it has been found that the voltage V suitable for the constant voltage source is in the range of two to three volts, with response times both for writing and erasing being less than 300 m sec. and contrast ratio more than 5:1. Evaluation for life has been currently continued by the present inventors at more than $10^6$ cycles. Meanwhile, it has also been found in the above experiment that the residual current after the erasing had been accomplished was less than 10 $\mu A/cm^2$ at 2.5 V. It is to be noted here that the contrast ratio mentioned earlier represents the ratio of integrated intensity of diffusive reflection light at the colored state to that at non-colored state when monochromatic light of 590 nm is perpendicularly incident upon the surface of the display electrode.

It is to be noted here that the driving method of the present invention described with reference to FIGS. 10 and 11 is equivalent to rendering the writing voltage $V_w$ to be zero in the constant voltage driving method described with reference to FIG. 8, and by this arrangement, the number of the segment change over switches can be reduced, with only one constant voltage source being required, while the density of the coloring is advantageously made uniform, thus achieving remarkable effects through simple construction. Furthermore, according to the driving method and display means therefor of the present invention, stable operation of the ECD can readily be achieved by the simplified constant voltage driving circuit.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. An electrochromic display means comprising an electrochromic display cell having a counter electrode and display electrodes divided into a plurality of display segments, said counter and display electrodes comprising an electrochromic substance of a type having a known coloration in a discharged condition;

electrolyte means contained within said electrochromic display means;

said electrolyte means having opacity for visually concealing said counter electrode from said display electrodes; and driving circuit means comprising a constant voltage source means for driving said electrochromic display cell, and switching means having writing and erasing contacts for selectively interconnecting said voltage source means with said cell;

said constant voltage source means having positive and negative terminals and being connected at said negative terminal thereof to said counter electrode and to said writing contact of said switching means, and at said positive terminal selectively to said display segments through said erasing contact of said switching means for selectively maintaining the said display segments being colored at the same potential as that of said counter electrode and applying to the said display segments being erased a predetermined positive voltage from said constant voltage source with respect to said counter electrode.

2. For an electrochromic display cell including a counter electrode comprised of electrochromic material, a plurality of display electrodes comprised of electrochromic material of a type having a known coloration in a charged condition, means for maintaining the counter electrode and the display electrodes at a fixed distance therebetween, an electrolyte provided within an opening between the counter electrode and the display electrodes, and opaque means contained within the electrolyte to visually conceal the counter electrode from the display electrodes, the method of driving said electrochromic display cell comprising the steps of:

applying to those display electrodes to be erased a predetermined positive voltage with respect to the counter electrode to maintain the counter electrode in a colored condition; and applying to those display electrodes to be colored, substantially the same potential as that applied to said counter electrode, to transfer the colored condition of said counter electrode to the said display electrodes to be colored.

3. A method of driving the electrochromic display cell as claimed in claim 2, wherein the area of said counter electrode is made several times as large as the display area of said display electrodes.

4. A method as claimed in claim 2, wherein said coloration of said display electrodes is accomplished by connecting said display electrodes to be colored to said counter electrode through a low impedance means.

5. A method as claimed in claim 4, wherein said electrochromic material comprises a solid state film.

6. A method as claimed in claim 5, wherein said solid state film comprises a transition metal oxide.

7. A method as claimed in claim 6, wherein said transition metal oxide comprises tungsten oxide.

8. A method as claimed in claim 2, wherein those display electrodes being erased have a predetermined positive voltage impressed thereon, said positive voltage being applied until subsequent display information is provided to color said display electrodes.

9. A method as claimed in claim 4, wherein the display electrodes being erased have a predetermined positive voltage impressed thereon, said positive voltage being applied until subsequent display information is provided to color said display electrodes.

10. A method as claimed in claim 8, wherein the value of the predetermined positive voltage is selected from a value of two to three volts.

11. An electrochromic display comprising:
a counter electrode comprised of electrochromic material;
a plurality of display electrodes each comprised of electrochromic material of a type having a known coloration in a charged condition;
means for maintaining the counter electrode and the display electrodes at a fixed distance therebetween;
an electrolyte provided within an opening between the counter electrode and the display electrodes;
opaque means contained within the electrolyte to visually conceal the counter electrode from the display electrodes;
constant voltage source means for driving said display; and
switching means interconnecting said constant voltage source means to said electrochromic display such that those display electrodes to be colored are placed at the same potential as that of the counter electrode and those display electrodes to be erased are impressed with a predetermined positive voltage with respect to the counter electrode such that said counter electrode is maintained in a colored condition.

12. An electrochromic display means as claimed in claim 11, wherein said switching means is a change-over switch.

13. An electrochromic display means as claimed in claim 11, wherein said switching means is a semi-conductor switch.

14. An electrochromic display in accordance with claim 11, wherein the area of said counter electrode is several times as large as the display area of said display electrodes.

15. An electrochromic display in accordance with claim 11, which further includes a low impedance path, and wherein said display electrodes are held at the same potential with respect to said counter electrode by said switching means connecting said display electrodes to said counter electrode through said low impedance path.

16. An electrochromic display in accordance with claim 11, wherein said electrochromic material comprises a solid state film.

17. An electrochromic display in accordance with claim 16, wherein said solid state film comprises a transition metal oxide.

18. An electrochromic display in accordance with claim 17, wherein said transition metal oxide comprises tungsten oxide.

19. An electrochromic display in accordance with claim 11, wherein said predetermined positive voltage is selected from a value of two to three volts.

20. An electrochromic display means in accordance with claim 1, which further includes a low impedance path, and wherein said display electrodes are colored by said switching means connecting said display electrodes to said counter electrode through said low impedance path.

21. An electrochromic display means in accordance with claim 1, wherein said predetermined positive voltage is selected from a value of two or three volts.

22. An electrochromic display means in accordance with claim 1, wherein said electrochromic substance comprises a solid state film.

23. An electrochromic display means in accordance with claim 22, wherein said solid state film comprises a transition metal oxide.

24. An electrochromic display means in accordance with claim 23, wherein said transition metal oxide comprises tungsten oxide.

* * * * *